(12) United States Patent
Selig, IV et al.

(10) Patent No.: US 7,680,631 B2
(45) Date of Patent: Mar. 16, 2010

(54) METHOD AND SYSTEM FOR ANALYZING LINEAR ENGINEERING INFORMATION

(75) Inventors: Ernest Theodore Selig, IV, Concord, MA (US); Gerald Cardillo, Worcester, MA (US)

(73) Assignee: Bentley System, Inc., Exton, PA (US)

( * ) Notice: Subject to any disclaimer, the term of this patent is extended or adjusted under 35 U.S.C. 154(b) by 737 days.

(21) Appl. No.: 11/298,452

(22) Filed: Dec. 12, 2005

(65) Prior Publication Data

US 2007/0136029 A1    Jun. 14, 2007

(51) Int. Cl.
G06F 19/00 (2006.01)
G06F 17/40 (2006.01)
G06Q 10/00 (2006.01)
G06Q 50/00 (2006.01)

(52) U.S. Cl. .................... 702/189; 702/33; 702/34; 702/35; 702/36; 702/127; 702/187; 705/1; 705/7; 705/8; 705/9; 705/28; 707/1; 707/3; 707/4; 707/10; 707/100; 707/104.1

(58) Field of Classification Search .................. 73/636, 73/570, 584, 596, 632, 633, 635; 702/1, 702/33, 34, 35, 36, 81, 127, 187, 83, 188, 702/189; 705/1, 4, 5, 6, 7, 8, 9, 10, 13, 16, 705/20, 21, 22, 24, 26, 28, 29, 30, 32, 33, 705/34, 35, 36 R, 38, 400, 417, 418; 104/2; 246/122 R; 707/1, 3, 4, 5, 10, 104.1; 715/200, 715/700

See application file for complete search history.

(56) References Cited

U.S. PATENT DOCUMENTS

| | | | | |
|---|---|---|---|---|
| 3,292,489 A * | 12/1966 | Johnson et al. | ............... | 353/25 |
| 4,796,466 A * | 1/1989 | Farmer | ..................... | 73/40.5 R |
| 4,974,168 A * | 11/1990 | Marx | .......................... | 702/187 |
| 5,943,666 A * | 8/1999 | Kleewein et al. | ............... | 707/2 |
| 5,978,717 A * | 11/1999 | Ebersohn et al. | .............. | 701/19 |
| 6,014,661 A * | 1/2000 | Ahlberg et al. | .................. | 707/3 |
| 6,243,657 B1 * | 6/2001 | Tuck et al. | ................... | 702/150 |
| 6,405,141 B1 * | 6/2002 | Carr et al. | ...................... | 702/36 |
| 6,405,195 B1 * | 6/2002 | Ahlberg | ......................... | 707/4 |
| 6,418,428 B1 * | 7/2002 | Bosch et al. | .................... | 707/2 |
| 6,470,352 B2 * | 10/2002 | Yaginuma | ................... | 707/102 |
| 6,507,796 B2 * | 1/2003 | Alexander | .................... | 702/70 |
| 6,584,419 B1 * | 6/2003 | Alexander | .................... | 702/68 |
| 6,600,999 B2 * | 7/2003 | Clark et al. | ................... | 702/35 |
| 6,804,621 B1 * | 10/2004 | Pedanckar | .................... | 702/94 |
| 6,885,948 B2 * | 4/2005 | Dupuis et al. | ................. | 702/34 |
| 6,889,888 B2 * | 5/2005 | Dupuis et al. | ............... | 228/103 |
| 7,130,753 B2 * | 10/2006 | Pedanekar | .................... | 702/94 |
| 7,164,476 B2 * | 1/2007 | Shima et al. | ............. | 356/241.1 |
| 7,200,529 B2 * | 4/2007 | Cifra et al. | ................... | 702/189 |
| 7,380,213 B2 * | 5/2008 | Pokorny et al. | ............. | 715/764 |
| 2002/0128786 A1* | 9/2002 | Alexander | .................... | 702/66 |
| 2004/0021858 A1* | 2/2004 | Shima et al. | ............. | 356/241.1 |
| 2008/0250326 A1* | 10/2008 | Mather | ........................ | 715/744 |

* cited by examiner

*Primary Examiner*—Edward R Cosimano
(74) *Attorney, Agent, or Firm*—Venable LLP; James R. Burdett; Jeffri A. Kaminski

(57) ABSTRACT

A system for analyzing linear data is provided. The system comprises a datastore of linear data correlated by distance; a library of functions that may be performed on the linear data; computer executable code stored on a computer readable medium for performing an analysis of the sets of linear data based on the functions in the library.

23 Claims, 5 Drawing Sheets

METHOD AND SYSTEM FOR ANALYZING LINEAR ENGINEERING INFORMATION

FIELD OF THE INVENTION

The invention relates to a system and method for analyzing linear data.

BACKGROUND OF THE INVENTION

Linear assets, such as railroads, roads, pipelines and the like are integral infrastructure for transporting information, goods and people. The maintenance and improvement of these linear assets is critical to the economy and security of this country. Any improvement in management maintenance of linear assets and the technology involved in maintenance tasks can have a substantial influence on the revenue, safety, and reliability of the linear asset. In today's environment with fewer resources and shrinking budgets, having a proper maintenance management system in place to assist managers and engineers with getting the most out of their existing infrastructure assets is essential.

For example, for a linear asset such as a railway, much information needs to be captured and analyzed to assess the overall condition, maintenance, capital spending, and inspection guidance of the railroad tracks. Examples of information that can be collected include track availability, use of track time, track condition, performance history, and the worked performed. Measurements of the condition of a linear asset such as track typically include continuous and spot measurements from automatic inspection vehicles, visual inspections from daily walking inspections, and records of in-services failures. Examples of conditions measured by automatic inspection vehicles include geometry car measurements (deviation from design curves, geometry exceptions to railroad standards, vehicle ride quality exceptions), rail measurements, gage restraint measurements, track deflection and stiffness measurements, clearance measurements, and substructure measurements (ground penetrating radar, cone penotrometer).

The information regarding a linear asset is usually collected and maintained, for example, in a set of track charts or line books. A track chart is the linear representation of all infrastructure assets along a linear asset based upon a maker posts (e.g., mile post, kilometer post, engineering station marker) and offset (e.g., footage, yard, meter) measurement system. Updating the track charts generally occurs on an ad hoc basis, so discrepancies, missing facilities, and incorrect location information are common. Other maps of the linear asset corridor may exist to further define the infrastructure layout, for example, property evaluation maps and topographic maps. These maps are rarely updated on a regular basis and are not always complete.

Even with a complete accurate map of the corridor, rail, ties, and other corridor assets do not bear any physical characteristics that lead to easy identification. Furthermore, problem areas for targeted maintenance often times do not obey discrete physical boundaries such as beginning and end of a rail section. Additionally, the development of a variety of track condition indicators such as geometry cars, rail defect detection equipment and gage restraint management systems have resulted in a significant amount of new and useful information for track maintenance. A large amount of information provided over a large area quickly leads to information overload.

Moreover, much of the data that is collected about the linear asset is dispersed across independent systems that are difficult to access and are not correlated. If the data from each of these independent systems is combined into a common correlated data system, this system could provide a rich new set of information that greatly adds to the value of the individuals systems. A simple example is that it is common for facilities like railroads to collect work records of where work has been done. Railroads also typically measure the quality of their tracks to see where work needs to be done. However, these two data sets remain in separate and individual systems. By combining the data into a location correlated data set, the quality and/or the effectiveness of the work being performed can be analyzed by comparing the track quality from before and after the work at the location where the work was completed.

However, even facilities that have recognized the value of combining data sets in order to mine useful information must implement expensive and usually inflexible custom software to extract the knowledge that they need. Consequently, it is difficult to experiment with new ideas. A new project must be started to implement new analysis tools. The cost and effort involved introducing new analysis tools is often prohibitive and results in the tools never being built.

Accordingly, there is a need for an improved system and method for analyzing data about linear assets. It is only with a unified perspective on all the relevant data within a single, accurate format that the people that work with linear information can begin to analyze linear data. The system should answer the questions like what should be worked on and why? Such a system should equip the user with the knowledge and understanding of infrastructure's condition and configuration, so maintenance resources could be targeted to only those areas needing work. The system should also provided the information needed to plan and evaluate opportunities for such things as facility upgrades and expansions. An effective maintenance management system results in direct savings on both maintenance programs and capital expenditures.

SUMMARY OF THE INVENTION

Embodiments of the invention provide a method for analyzing linear data, comprising: receiving a user defined function; receiving a plurality of sets of linear data (data representing a linear asset); providing at least two of the sets of linear data as input to the function; outputting a third set of data as a result of the function.

In another embodiment of the invention, a system for analyzing linear data is provided. The system comprises a datastore of linear data correlated by distance; a library of functions that may be performed on the linear data; computer executable code stored on a computer readable medium for performing an analysis of the sets of linear data based on the functions in the library.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements.

DETAILED DESCRIPTION OF THE INVENTION

Figure 1:
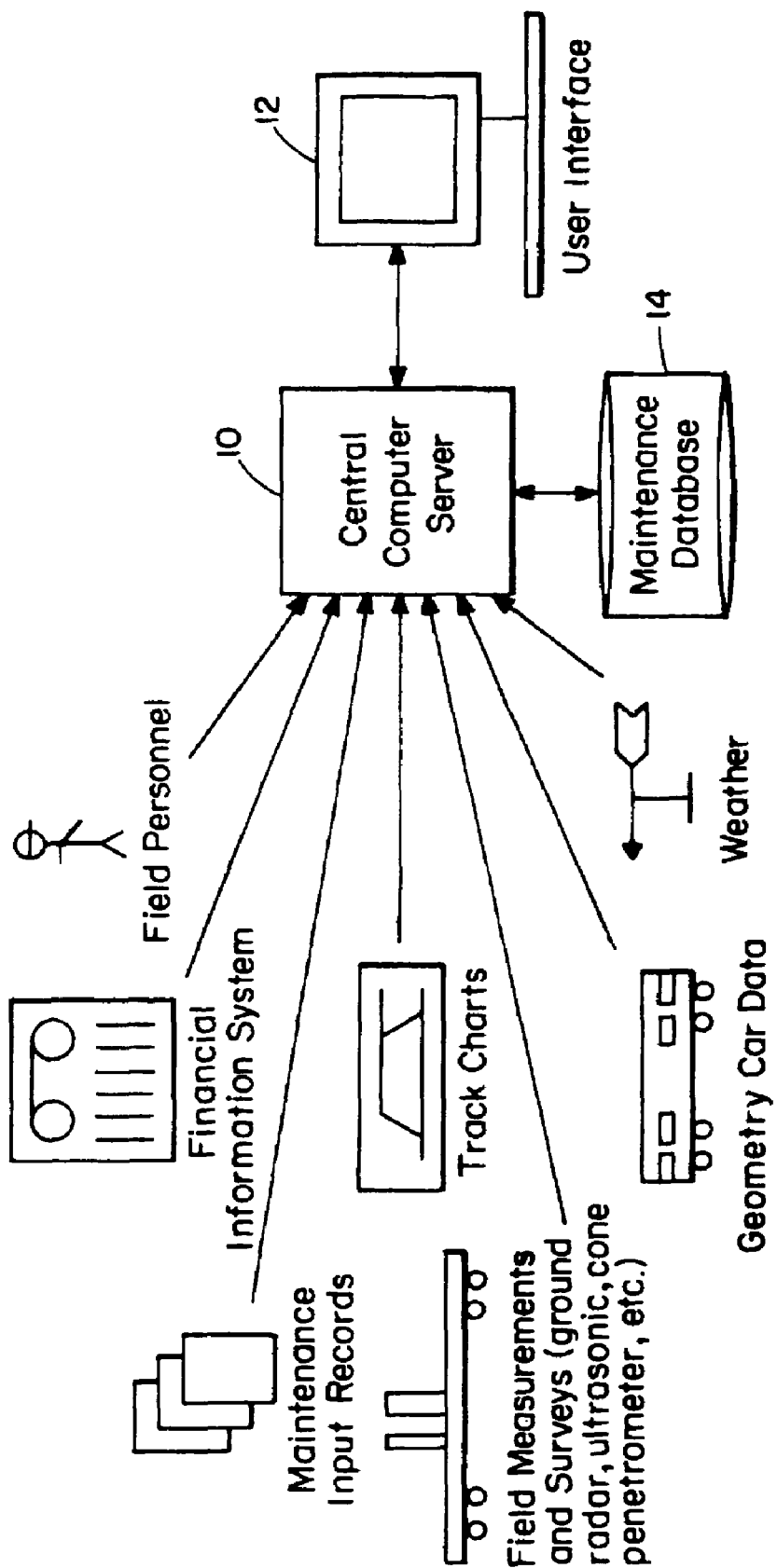
FIG. 1 depicts an example of a system according to an exemplary embodiment of the present invention.

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. Moreover, an embodiment of the invention in the context of railroad maintenance is provided below. However, the invention is not limited to railroads and may be applied to other environments. A person skilled in the relevant art will recognize that other components and configurations can be used without parting from the spirit and scope of the invention.

Embodiments of the present invention provide a unified view and tool for collecting, viewing and analyzing dimensions of a linear asset's condition and performance over time. Tools may be provided to import and align data regarding the linear asset. Accordingly, data may be imported from many different independent sources into a common location correlated data set. The data set may be stored in a database that can store ten of thousands of miles of data regarding the linear asset. A set of visualization tools may also be provided to visualize the data. A tool set may be provided that allows analysis procedures to be quickly and efficiently set up, without the need to develop new software. The tool set should fully integrate with and utilize the datastore and may include data visualization functionality. This integration provides an enterprise class foundation for the analysis tool set and greatly reduces the efforts and risks regarding the development of analysis tools. A user interface that allows interactive construction of the analysis and viewing of the results of the analysis may also be provided.

An embodiment of the present invention system provides and collects information through a distributed computer network. A central datastore integrates information regarding the linear asset. In the example of a railroad, the database integrates railway information encompassing the following areas: Layout—Configuration of rail line elements along a rail route including aspects such as number of lines, curvature of track, and location of bridges, tunnels, signals, turnouts, drainage, cuts and fills; Inventory—Track component description such as type of tie, rail, fastener, ballast and installation date; also description of structures such as bridges and culverts; Condition—Location and date of track condition information such as rail breaks, ultrasonic/x-rays defects, rail wear, rail corrugation, track geometry measurements, ground penetrating radar scans, drainage, ballast, subgrade; Maintenance Input—Location and date of maintenance action taken, including aspects such as rail break repair, rail grinding, tamping, ballast cleaning, and tie replacement; Traffic—Accounting of annual tonnage, axle loads, frequency of usage, and types of traffic; Weather—Seasonal precipitation and temperature ranges; Cost Information—Cost of items such as train delays, maintenance, and track components; and Analysis—Geometry changes with time, rate of tie replacement.

The central datastore may be derived from a variety of data sources and may provide information to multiple system users. The central datastore may also be enhanced to dynamically interact with other information servers (e.g., through client-server database standards, middleware, or multi-tier architecture).

Referring now to FIG. 1, a central office computer server 10 provides a repository for all data related to the linear asset, such as layout, inventory, condition and maintenance input, traffic, weather, cost information, and analysis data. Data inputs are collected from multiple sources. For example, in the context of a railroad, data may be collected from including existing computer systems, paper records (e.g., maps), track experts (e.g., Track Inspectors, Track Supervisors, District Engineer), inspection equipment (e.g., Geometry Car, Sperry Rail Flaw Detector Car, Ground Penetrating Radar, etc.), and sensors (e.g., traffic and weather).

The central server 10 maintains and stores this data in the central working datastore 14. Central server 10 and working datastore 14 may employ forward and store, search and retrieve and other protocol common in the art for maintaining and accessing datastore data. In the preferred embodiment, protocols of a client/server paradigm are utilized.

A user interface 12 according to an embodiment the present invention provides a powerful analysis tool by its ability to integrate layout, inventory, condition, maintenance input, traffic, weather, and cost influences at any location along a linear asset. The ability to have a combined view of the maintenance management influences is helpful to correlate symptoms and influences needed to assist in resolving the cause of track deterioration and choose corrective action. An example user interface is described in more detail in U.S. Pat. No. 5,978,717, which is incorporated herein by reference.

The user interface computer display screen may be subdivided into multiple windows (shown simultaneously) with a common X-axis that defines the location along the linear asset. Components of maintenance management information to be combined in the user interface may be selected from a menu. Each window may have an independent vertical Y-axis and a common horizontal X-axis. The X-axis may displayed with the linear asset's mile-markers or other location information. A user thus scrolls left and right to view data along the line for each selected asset. The X-axis scale may be provided in miles or other measure of distance. Information over a shorter or longer length of the linear asset may be viewed by zooming in and out along the X-axis.

Figure 2:
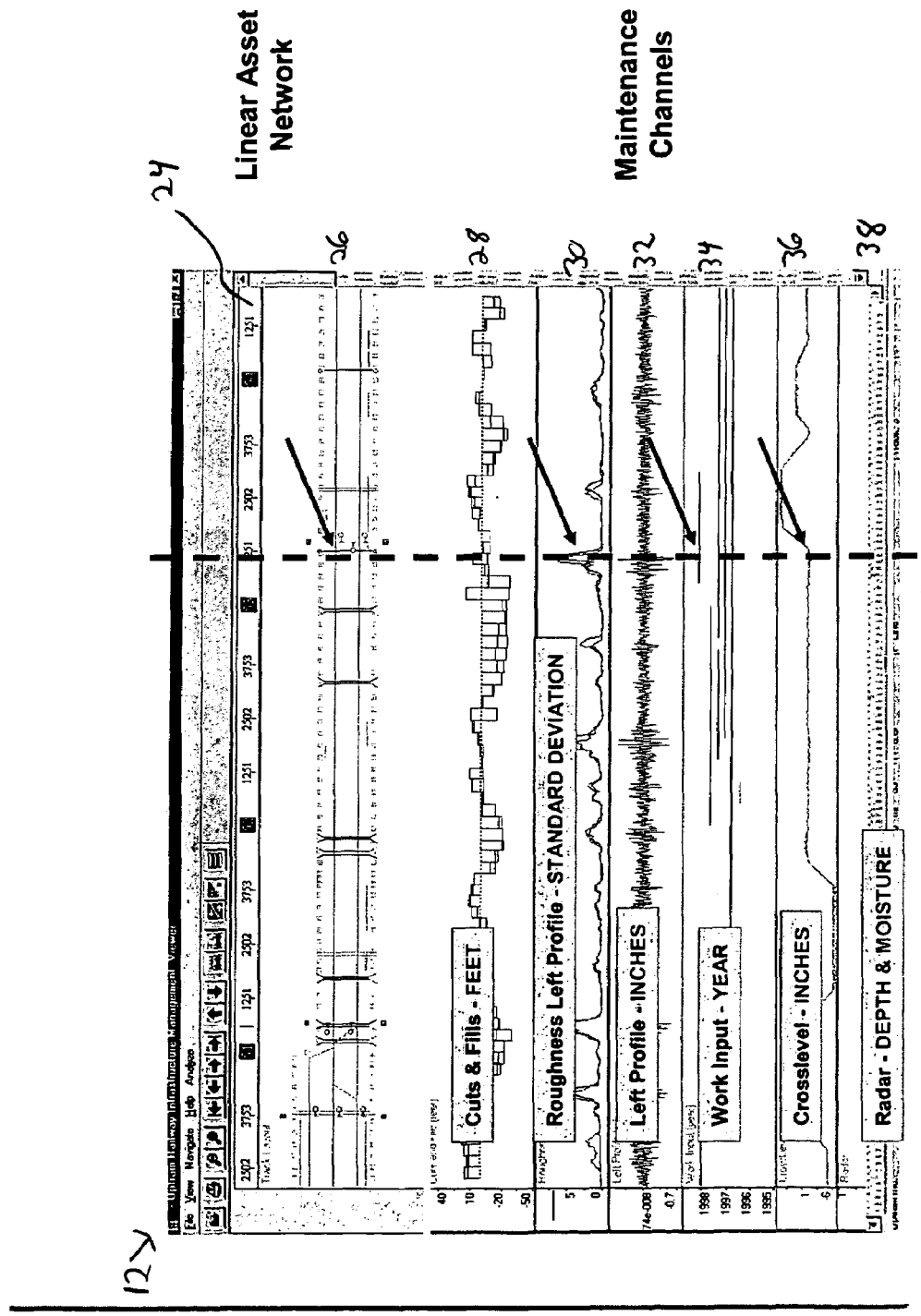
FIG. 2 depicts an example of a user interface according to an exemplary embodiment of the present invention.

An example of the user interface 12 display is found in FIG. 2. The interface is an example of an interface from the Optram product, available from Bentley Systems. The user interface 12 provides multiple views of the linear asset maintenance management data. Each type of maintenance management data is displayed in relation to its location along the linear asset. The user interface 12 allows the user to interrelate the maintenance management windows against a common X-axis. In the example of a railroad, the layout window graphically displays a plan view of all the tracks on a line. The track under observation is highlighted in the layout window.

A scale 24 indicates a measure of distance along the linear asset, here in terms of miles and feet. The interface 12 may be divided into different areas or windows that display different maintenance management data. For example, the interface 12 includes areas 26-38. Area 26 of the interface 12 illustrates the track layout. Area 28 of the interface 12 illustrates the cuts and fills along the track in terms of feet. Area 30 of the interface 12 illustrates the roughness of the left profile in terms of standard deviation. Area 32 of the interface 12 shows the left profile in inches along the length of the track. Area 34 of the interface 12 indicates the different sections of the track where work was performed and the year the work was performed. Area 36 indicates the crosslevel of the track in inches along the length of the track. Area 38 illustrates the results of a radar scan indicating the depth and moisture of the ground along the length of the track. The Optram product provides a location correlated view of the different data sets regarding a linear asset.

Embodiments of the present invention provide a system and method to combine the data regarding a linear asset, for example data shown in the various areas of interface 12, in order to extract additional information from the data. Embodiments of the invention provide a tool set, for example a library of various functions that may be performed on the linear data, for analyzing the data. One or more of the functions in the library may be selected to build the analysis. The library of functions may provide the ability to create an analysis of the linear data in a manner unique to the form of the linear asset data. For example, the information stored in the central datastore can be analyzed to show where work should be performed on the linear asset. The results of the analysis may be displayed to the user in an easy to understand form, such as a continuous plot, by color coding different areas of information in the interface, etc., which may show where work needs to be performed along the linear asset. The tool set should include a reusable set of functions used to create the analysis.

The tool set should allow data along the linear asset to be manipulated with a standard set of functions. Examples of the types functions that may be included in the tool set includes trending, alignment, network path reckoning, handling locations by GPS, accelerations, or odometers, mathematical operation, thresholding (single and compound), statistical operations, logic operations, route operation, resampling, spectral analysis and operations, and fractural analysis and operations. The functions may be embodied as software routines stored on a computer readable medium, hardware, or circuits. The software routines may be stored in a library local to a user's computer or in the central datastore.

In embodiment of the inventions, user defined functions may be included in the library. A user may create a function, for example an algorithm they repeatedly use. The user defined function may be loaded into and stored in the library. The user defined function may be used in the same manner as other functions in the library.

One or more functions from the library may be selected and combined in any fashion to create the analysis. The user may select the dataset(s) on which the analysis is to be performed. The user may be presented with a list, menu or other display of the various functions available in the library. Particular function(s) to be used in an analysis may be selected from the list. The user may also select the data sets that are to be analyzed. An input device, such as a computer keyboard or mouse, may be used to select the functions and the data.

The functions are adapted to operate on linear data. Operations on linear data are particularly difficult as they must account for both time and location. Prior methods of performing functions on linear data rely on predefined sections of the linear asset. The data for a section is averaged and the average value used for operations including that section. In contrast, embodiments of the present invention utilizes continuously measured data that spans lengths of the linear asset. Also, an analysis may be performed on certain segments of the linear asset. The segments may be selected by the user. All the data points for the selected segment are used in the analysis.

The functions may account for missing or overlapping data. For example, linear data regarding a railroad may be obtained by running a geometry car over the track. The geometry car may be used to measure the space between the two rails of the track at every foot along the rails. However, there may be instances where the geometry car must make a detour from a track being measured and run on a parallel track. In such a case, there will be skips in the data collected along the track over time. Additionally, when the geometry car runs over the parallel track, there may be two runs conducted over the same area of track resulting in two sets of data for one track. The functions should account for these gaps in data over time.

As noted above, the maintenance management data may be in different formats. The functions should account for the different. One embodiment accounts for the different formats by converting the data into a common format before analyzing the data.

Figure 3:
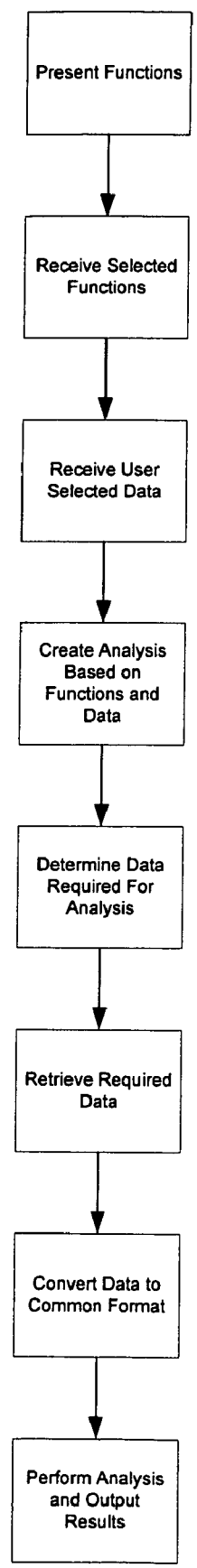
FIG. 3 depicts an example method according to an exemplary embodiment of the present invention.

Turning now to FIG. 3, a method according to an exemplary embodiment of the invention is described. In an example scenario, it is desired to identify those areas along the length of a track where work has been performed in the last three years and the roughness profile exceeds a certain threshold. The logical AND operation may be applied to the linear data to quickly identify the appropriate locations. In an exemplary embodiment, a menu presenting the available functions may presented to a user via a GUI. The user may to select the logical AND operation from a list of available tools. An AND operation requires at least two sets of data to be ANDed together. The user may then be prompted to select from interface 12 or another menu the data on which the AND operation is to be performed. The order of selecting the functions and data may vary. In this example, the roughness left profile dataset in area 30 and work input data set in area 34 are selected for analysis.

A segment of the track over which the analysis is to be performed may be selected. For example, it may be specified that the analysis is to be performed along the length of track between mile posts 51-74. The various selections of functions, datasets, etc. may be made graphically, via a computer keyboard, or other input device. The various inputs are received and processed by the system to determined the specified analysis.

Once the analysis to be performed is defined, it is determined what particular data is required to perform the analysis. The data for the analysis may be one or more complete datasets stored in the central datastore. More likely, only a portion of the data stored in the central datastore is needed for the analysis. Only the data on which the analysis is to be performed is needed from the datastore. Even then, only a subset of the dataset specified by the user may be necessary for the analysis. In the example given above, the roughness left profile and work input datasets are specified. Only a subset of those two datasets, from mile posts 51-74 is required for the analysis. Consequently, only the roughness left profile and work input data from milepost 51-74 may be retrieved from the central datastore.

The retrieved data may be converted into a common format for analysis. There are typically three types of data used in an analysis. The first type of data is "asset," such as a bridge, tunnel, etc. Assets on or along the right of way of the linear asset can effect the quality and cost of the linear asset. The second data type is an "event." An event is defined by where and when the event occurs along the linear asset. For example, where and when work or failures of the linear assert occurred. The third type of data is "measured condition." A measured condition is data that is collected by a machine and is sampled at a constant interval. For example, pipelines run a device, called a pig, down a pipe to measure a number of parameters, such as the diameter and roundness of the pipe at every foot along the pipeline.

Accordingly, the data retrieved from the central datastore may be in different formats. For example, the data the roughness profile dataset is typically in plot format (where data values are available a regular distance intervals (e.g., every foot)). The work input dataset is typically in event format (where event has a start and end linear location (e.g., mile+ foot offset) and a start and end date & time). The data should be converted to a common format in order for the functions and analysis to be performed. The datasets not necessary for the analysis should remain in the datastore in their current form. In an exemplary embodiment of the invention, a common format for the data is an event. All data types used in the analysis may be converted into the common format, here events. The converted data is called an event layer. The analysis is performed on the data in the form of events and an event set is generated as the result.

More specifically, an event is a location along a linear asset defined by a start and an end location and a start and an end time of when this event occurred at this location. For example, the work performed on a linear asset in event format is defined by the start and end locations of the segment of track where the work was performed and the start and the end times of when the work was performed. A bridge along the linear asset, in event format may be defined by the start and end locations of the bridge. The start time for the bridge may be date when the bridge was built. The bridge would not have an end time as the bridge is still in existence.

After the data is converted to a common format, the specified functions in the analysis may be performed and results generated. Results of the analysis may be presented, for example, in graphical or tabular form.

Figure 4:
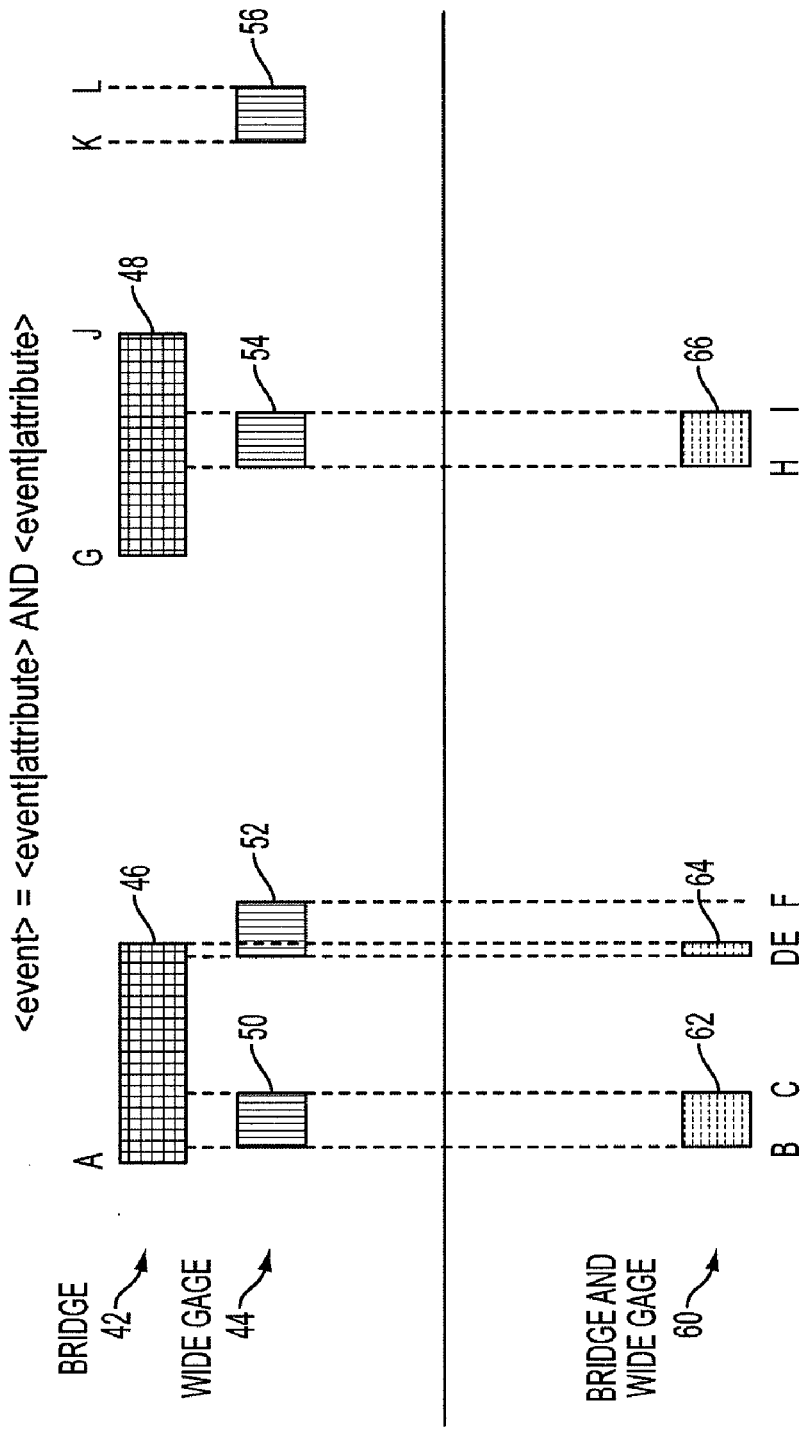
FIG. 4 depicts graphically an example analysis according to an exemplary embodiment of the present invention.

Referring now to FIG. 4, an example analysis is described. The analysis is defined to determine locations along the railway where a bridge is located and where the gage between the rails exceeds 59 inches. Based on the defined analysis, it is determined that the bridge and gage datasets are needed to conduct the analysis. These datasets are retrieved from the central datastore. Event layers for the bridge 42 and the wide gage 44 are then created. In this example, there are two bridge along the tracks, both built in 1974. A first bridge is located between locations A and E and a second bridge is located between locations G-J. Accordingly, the bridge event layer 42 includes two events. The first event has 46 start location A, end location E, and a start time of 1974 and no end time. The second event 48 has a start location of G, end location J, a start time of 1974, and no end time.

The wide gage data indicates four locations at which the gage between the rails exceeds 59 inches, as of a measurements taken in July 2005. Wide gage has been measured between locations B-C, D-F, H-I, and K-L. Accordingly, there are four events in the event layer 44 for the wide gage data. A first event 50 has a start location B, end location C, start date July 2005, and no end date. The second event 52 has a start location D, end location F, start date July 2005, and no end date. The third event 54 has a start location H, end location I, start date of July 2005, and no end date. The fourth event 56 has a start location K, end location L, start date July 2005, and no end date.

The event layers for the bridge 42 and the wide gage 44 data are then ANDed with each other to determine those locations where there is both a bridge and wide gage. As can be seen in FIG. 4, there are three locations along the rail which satisfy these requirements; between B and C, between D and E, and between H and I. As such, the resulting event layer 60 includes three events, a first event 62 having a start location B, end location C, start time July 2005, and no end time, a second event 64 having a start location D, end location E, start time July 2005, and no end time and a third event 66 having a start location H and end location I, start time July 2005, and no end time.

It should be noted that before the wide gage event layer 44 was created, those locations where the gage between the rails exceeds 59 inches is determined. For example, a function may be performed on the raw data stored in the central datastore to identify those areas where the gage exceeds the specified threshold. Alternatively, the wide gage dataset may be converted to an event format and a thresholding operation on the converted data. An event layer may be created in areas along the linear asset where the specified threshold is exceeded. The other data in the datastore with respect to the gage is not included in the event layer.

In general, when an event layer is created, additional information may be included in the event layer. For example, in the thresholding example given above, the user may specify that the highest value of the gage be included in the event layer. This additional information may be useful in future processing or for information purposes.

Figure 5:
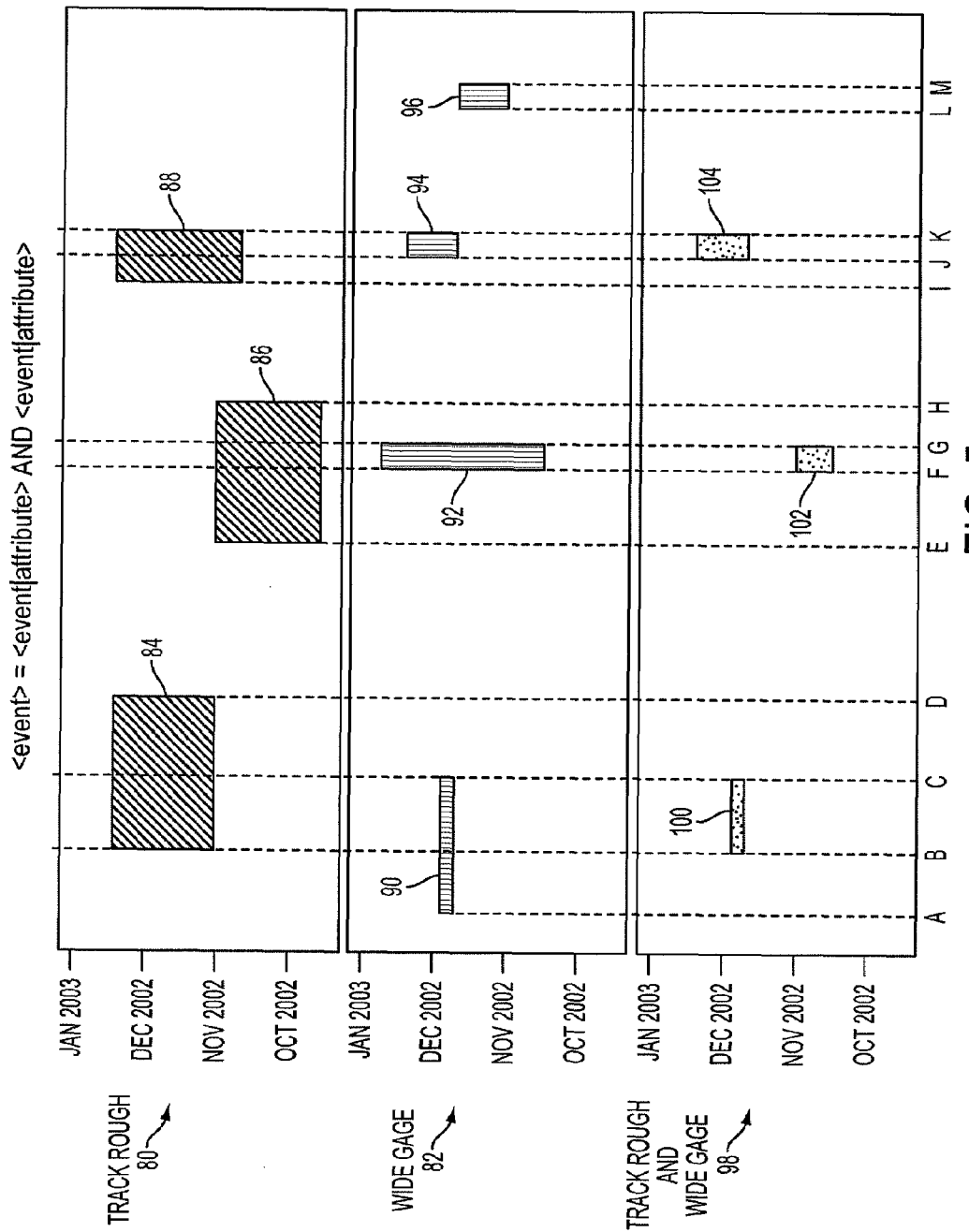
FIG. 5 depicts graphically another example analysis according to an exemplary embodiment of the present invention.

FIG. 5 illustrates another example analysis. The analysis graphically depicted in FIG. 5 determines times at which there was wide gage and a rough track. Based on the defined analysis, it is determined that the rough track and wide gage data sets are needed to conduct the analysis. These data sets are retrieved from the central data store. Event layers for the rough track 80 and wide gage 82 are created. The event layers depict the times at which a rough track and a wide gage were measured. The rough track event layer 80 indicates three different locations and time periods where rough track was measured. Consequently, three events are created. Event 84 has a start location B, end location D, start time November 2002, and end time mid-December 2002. Event 86 has start location E, end location H, start time September 2002 and end time November 2002. Event 88 has start location I, end location K, start time November 2002, and end time mid-December 2002.

The wide gage data indicates four locations and time periods where wide gage was measured. Consequently event layer 82 includes four events. Event 90 has a start location A, end location C, start time late November 2002 and end time December 2002. Event 92 has start location F, end location G, start time mid-October 2002, and end location late December 2002. Event 94 has start location J, end location K, start time mid-November and end time mid-December 2002. Event 96 has start location L, end location M, start time November 2002, and end time December 2002.

The event layers for the rough track 80 and the wide gage 82 are ANDed with each other to determine those locations and times where there is both rough track and wide gage. Event layer 98 illustrates the result of the ANDing process. There are three locations and time periods which satisfy these requirements, between locations B-C, F-G, and J-K. Accordingly, the resulting event layer 98 includes three events. Event 100 has a start location B, an end location C and spans late November 2002. Event 102 has a start location F, an end location G, and spans mid-October 2002 through November 2002. Event 104 has a start location J, an end location K, and spans late November 2002 through mid-December 2002. Accordingly, it can be seen that embodiments of the present invention allow for analysis based on time as well as location.

The system and method may use a graphical interface as described above or other methods, such as a language, to create an analysis. For example, an example of a language to generate a report indicating the number of exceptions at a bridge transitions is as follows:

```
1. Select a route and the linear range of the data that will be processed.
SetRoute(APtrack2, AP, 88, 234, AZ, 110, 2344)
2. Generate an extent layer named BRIDGES that has an extent that spans the
location of each bridge. Note: The asset
layer Bridge in the ORIM data source contains the bridge information.
BRIDGES = GenExtent(Bridge)
3. In order to get exceptions near the bridge transitions we will need to widen our
bridge extents by 50 feet. Here we
create a new extent layer named BRIDGES_EXPANDED that contains the
widened extents.
BRIDGES_EXPANDED = Dilate(BRIDGES, 50)
4. Since we do not want to count exceptions that are in the middle of a long bridge
we will create an extent layer for the
center portion of the bridges.
BRIDGE_CENTERS = Erode(BRIDGES, 50)
5. Create an extent layer BRIDGE_TRANSITIONS that is the logic subtraction of
bridge centers from the widened
bridges.
BRIDGE_TRANSITIONS = XOR(BRIDGES_EXPANDED,
BRIDGE_CENTER)
6. Use the extent layer BRIDGE_TRANSITIONS as a grouping mask to count the
number
of exceptions for each bridge transition.
AddAttribute(BRIDGE_TRANSITIONS, EXCEPTION_COUNT)
BRIDGE_TRANSITIONS.EXCEPTION_COUNT = EventCount(Exceptions,
BRIDGE_TRANSITIONS)
7. Export the information in the BRIDGE_TRANSITIONS layer to a spreadsheet
file.
Export(BRIDGE_TRANSITIONS, brigeTransitionExceptions.csv)
8. Save the bridge transitions to the datastore so that other users can view them in
the
ORIM Viewer.
SaveToDatabaseLayer(BRIDGE_TRANSITIONS, Bridge_transition)
```

The embodiments illustrated and discussed in this specification are intended only to teach those skilled in the art the best way known to the inventors to make and use the invention. Nothing in this specification should be considered as limiting the scope of the present invention. The above-described embodiments of the invention may be modified or varied, and elements added or omitted, without departing from the invention, as appreciated by those skilled in the art in light of the above teachings. It is therefore to be understood that, within the scope of the claims and their equivalents, the invention may be practiced otherwise than as specifically described.

We claim:

1. A method for analyzing linear data, comprising:
   receiving a first user defined function defining a mathematic analysis;
   receiving a plurality of sets of linear data having a length component and that represents a linear asset;
   providing at least two of the sets of linear data as input to the function;
   performing the mathematic analysis on the at least two sets of linear data representing the linear asset based on the function with a computer to obtain a third set of data; and
   outputting information regarding a condition and configuration of the linear asset based on the third set of data.

2. The method of claim 1, further comprising:
   receiving a second user defined function defining the mathematic analysis; and
   applying the second function against one of the at least two sets of linear data prior to providing the linear data as input to the first function.

3. The method of claim 1, wherein the linear data includes a start location, an end location, a start time, and an end time.

4. The method of claim 1, further comprising receiving the linear data, wherein the linear data is correlated along the length of the linear asset.

5. The method of claim 1, further comprising:
   determining the linear data needed to perform the user defined function; and
   retrieving the linear data necessary to perform the function.

6. The method of claim 1, further comprising providing the third set of data in a graphical or tabular output.

7. The method of claim 1, wherein at least two of the sets of linear data are in different formats.

8. The method of claim 7, further comprising changing the linear data to a common format having a length component and a time component.

9. The method of claim 1, further comprising creating a layer of linear data.

10. The method of claim 9, wherein the layer includes an additional data point.

11. A method comprising:
    collecting data, including linear data having a length component, that represents a linear asset, the data having different formats;
    converting the data into a common format having a length component and a time component to obtain converted data representing the linear asset;
    providing the converted data representing the linear asset as input to a functional analysis;
    combining the converted data representing the linear asset with a computer based on the functional analysis to determine a result;
    providing information regarding a condition and configuration of the linear asset based on the result; and
    controlling operations performed on the linear asset based on the condition and configuration information.

12. The method of claim 11, providing a set of operations that may be performed on the data.

13. The method of claim 11, further comprising storing the data in a common datastore.

14. The method of claim 13, further comprising correlating the data in the common datastore based on location and time.

15. The method of claim 13, further comprising:
providing a library of predefined functions that may be performed on the linear data;
receiving user input selecting the functions to define the functional analysis;
obtaining the data needed to perform the analysis from the datastore;
providing the data as input to the functional analysis; and
performing the functional analysis.

16. A system for analyzing linear data, comprising:
a datastore storing sets of linear data having a same format and correlated as to distance and time, the linear data representing a linear asset;
a library of functions that may be performed on the linear data representing the linear asset;
computer executable code stored on a computer readable medium for performing an analysis combining the sets of linear data based on the functions in the library to provide a result indicating areas of the linear asset requiring operations; and
a display displaying the linear data and indicating areas of the linear asset requiring operations based on the result.

17. The system of claim 16, further comprising an interface for a user to define the analysis graphically, the user interface presenting the functions to the user and receiving user input creating the analysis from the functions.

18. The system of claim 16, further comprising an interface for a user to define the analysis at a command line, the user interface presenting the functions to the user and receiving user input creating the analysis from the functions.

19. The system of claim 16, wherein the functions include at least one of:
logic operations, math operations, spectral analysis, fractal analysis, trending, alignment, route operations, and statistical operations.

20. The system of claim 19, wherein the math operations includes addition, subtraction, multiplication, and division.

21. The system of claim 19, wherein the logic operations include AND, OR, XOR and NAND.

22. A method of performing operations on linear data, comprising:
providing a library of functions adapted to be performed on linear data having a length component and that represents a linear asset;
receiving selected ones of the functions;
creating an analysis to be performed on the linear data based on the selected functions;
and executing the selected functions on the linear data representing the linear asset to transform the linear data into a third set of data; and
outputting information regarding a condition and configuration of the linear asset based on the third set of data.

23. The method of claim 22, further comprising:
determining the linear data to be operated on by the functions to obtain selected linear data; and
retrieving the selected linear data from a datastore.

* * * * *